United States Patent [19]

Ruszkay

[11] Patent Number: 5,416,241
[45] Date of Patent: May 16, 1995

[54] METHOD FOR PURIFYING POLYETHER POLYOLS MADE WITH DOUBLE METAL CYANIDE CATALYSTS

[75] Inventor: Jude T. Ruszkay, Coatesville, Pa.

[73] Assignee: Arco Chemical Technology, L.P., Greenville, Del.

[21] Appl. No.: 187,955

[22] Filed: Jan. 27, 1994

[51] Int. Cl.$^6$ ............................................. C07C 41/34
[52] U.S. Cl. ..................................... 568/621; 568/620
[58] Field of Search .......................................... 568/621

[56] References Cited

U.S. PATENT DOCUMENTS

| | | | |
|---|---|---|---|
| 3,278,457 | 10/1966 | Milgrom | 260/2 |
| 3,829,505 | 8/1974 | Herold | 260/611 |
| 4,355,188 | 10/1982 | Herold et al. | 568/620 |
| 4,721,818 | 1/1988 | Harper et al. | 568/120 |
| 4,877,906 | 10/1989 | Harper | 568/621 |
| 4,987,271 | 1/1991 | Watabe et al. | 568/621 |
| 4,994,627 | 2/1991 | Cuscurida et al. | 568/621 |
| 5,010,047 | 4/1991 | Schuchardt | 502/24 |
| 5,012,013 | 4/1991 | Wimmer et al. | 568/621 |
| 5,099,075 | 3/1992 | Katz et al. | 568/621 |
| 5,144,093 | 9/1992 | Reisch et al. | 568/621 |
| 5,235,114 | 8/1993 | Reisch et al. | 568/621 |
| 5,248,883 | 9/1993 | Hinney et al. | 568/621 |
| 5,266,681 | 11/1995 | Reisch et al. | 568/621 |

FOREIGN PATENT DOCUMENTS 2265921 10/1990 Japan.
4214722 8/1992 Japan.

OTHER PUBLICATIONS

J. L. Schuchardt & S. d. Harper, "Proceedings of the SPI:32nd Annual Technical/Marketing Conference", Oct. 1989, pp. 360–364.

*Primary Examiner*—Joseph E. Evans
*Attorney, Agent, or Firm*—Jonathan L. Schuchardt

[57] ABSTRACT

A method for purifying polyether polyols made with double metal cyanide (DMC) catalysts is disclosed. A poly(oxypropylene) polyol containing DMC catalyst residues is combined with an amount of an alkali metal compound sufficient to convert DMC residues to an insoluble species, but not sufficient to generate polyol alkoxide groups. The polyol is heated in the presence of water, and is then filtered and stripped. The method eliminates the need to use magnesium silicate in removing DMC catalysts from polyols.

20 Claims, No Drawings

METHOD FOR PURIFYING POLYETHER POLYOLS MADE WITH DOUBLE METAL CYANIDE CATALYSTS

FIELD OF THE INVENTION

The invention relates to purification of polyether polyols. In particular, the invention is a method of removing double metal cyanide (DMC) catalyst residues from a poly(oxypropylene) polyol.

BACKGROUND OF THE INVENTION

Double metal cyanide complexes are well-known catalysts for polymerizing epoxides. The catalysts are extremely reactive, and can be used to make polyether polyols, even high molecular weight polyols, having low unsaturation.

Following epoxide polymerization, catalyst residues are preferably removed from polyether polyols because polyols containing catalyst residues tend to accumulate volatile impurities during storage. In addition, residual polyol catalysts can have an unintended catalytic or poisoning effect during formulation of the polyols in polyurethanes. Methods of removing conventional basic catalysts from polyols (such as, for example, aqueous extraction or adsorption with magnesium silicate) are often ineffective for removing DMC catalyst residues from polyols. Consequently, several methods have been developed to address the particular problem of removing DMC catalysts from polyols.

U.S. Pat. Nos. 4,355,188 and 4,721,818, for example, teach methods for treating polyols made with a DMC catalyst. The polyol, which contains DMC catalyst residues, is heated with an excess of an alkali metal compound (metal, hydride, hydroxide), which deactivates the DMC catalyst, and converts a substantial proportion of the hydroxyl end groups of the polyol to alkoxide end groups. Ethylene oxide is then added to end-cap the polyol to give it primary hydroxyl end groups. The polyol product is then diluted with isopropyl alcohol and is ion-exchanged to remove DMC and alkali metal catalyst residues, or is treated with magnesium silicate and filtered to remove the catalysts. As Katz et al. suggest in U.S. Pat. No. 5,099,075, the method of U.S. Pat. No. 4,355,188 is not completely satisfactory for purifying all-propylene oxide-based polyols. Both techniques appear to be most useful when an EO end-capping step is included.

U.S. Pat. No. 4,877,906 teaches a multi-step method for purifying polyols made with DMC catalysts. First, the polyol is treated with an alkali metal compound in an amount sufficient to convert the DMC compound to an insoluble species, and at least some of the polyol hydroxyl groups to alkoxide groups. Second, the polyol is filtered. Third, the polyol is heated with a phosphorus-containing acid such as hypophosphorous acid. Finally, the product is filtered again to recover the purified polyol. The comparative examples in Table 3 of the reference indicate that treatment with KOH or NaOH at 1400–2700 ppm alone is ineffective in removing residual zinc from an EO-capped polyether polyol made with a DMC catalyst.

One technique applicable to all-PO polyols is described in U.S. Pat. No. 5,010,047. The method involves diluting the polyol with a nonpolar organic solvent such as hexanes, then filtering at room temperature using a filter aid such as diatomaceous earth. This method is impractical for large-scale use because large volumes of solvent must be combined with the polyol, stripped, and recovered. A more practical method would eliminate the need for a solvent.

U.S. Pat. No. 5,099,075 discloses a method for removing DMC catalyst residues from polyether polyols. The catalyst-containing polyol is treated with an oxygen-containing gas, oxidizing acid, or peroxide to convert the DMC catalyst to an insoluble species. Side products from over-oxidation might reasonably be expected from the use of such strong oxidants with polyether polyols because polyols are susceptible to oxidation.

Japanese Patent Appl. Kokai No. 4-214722 teaches a method for making polyether polyols using DMC catalysts. The reference teaches (Practical Example 1) a catalyst-removal method in which a poly(oxypropylene) polyol is heated in the presence of 6700 ppm of potassium methoxide to deactivate the DMC catalyst. The mixture is heated with magnesium silicate and water at 90° C., is filtered in the presence of the water, and is then stripped to remove water. The comparative examples show that filtration of the polyols is slower and catalyst removal is less complete when water is not included in the process.

Most treatment methods use magnesium silicate, diatomaceous earth, or mixtures of these to assist in removal of DMC catalyst residues. The methods commonly use from 2–10 wt. % of solids. For a lab-scale process, this amount of solids creates no substantial problem. However, when the treatment is performed on a large scale, it becomes imperative to minimize the amount of solids used to reduce material and waste-disposal costs. In addition, substantial polyol losses are incurred in the resulting filter cakes.

Improved methods for removing DMC catalyst residues from polyether polyols, particularly poly(oxypropylene) polyols, are needed. Preferably, multiple treatment steps would be avoided. A preferred method would not use solvents, would overcome any need to use strong oxidants, and would give consistent, reliable removal of DMC catalyst residues. The method would preferably minimize the amounts of treating reagents needed to achieve complete removal of the DMC catalyst residues to reduce reagent, treatment, and disposal costs. A method that would eliminate the need for an adsorption step with magnesium silicate would also be valuable.

SUMMARY OF THE INVENTION

The invention is a method of purifying a poly(oxypropylene) polyol made with a double metal cyanide catalyst. I have surprisingly found that relatively low concentrations of alkali metal compounds can be used to effectively remove DMC catalyst residues from polyols. I also unexpectedly found that effective removal of both alkali metal and DMC catalyst residues can be achieved in a single step without the use of magnesium silicate.

The method of the invention comprises combining a poly(oxypropylene) polyol with an amount of an alkali metal compound sufficient to convert the DMC catalyst residues to an insoluble species, but not sufficient to generate polyol alkoxide groups. (Most known methods use an excess of the alkali metal compound and form a substantial amount of polyol alkoxide.) Next, the polyol mixture is heated in the absence of magnesium silicate with at least about 1.5 wt. % of water based on the amount of polyol at a temperature within the range of about 80° C. to about 150° C. The mixture is then filtered to remove insoluble alkali metal and DMC catalyst residues, and is finally stripped to remove water from the polyol.

The method of the invention provides a simple, reliable approach to removing DMC catalyst residues from poly(oxypropylene) polyols. Surprisingly, catalyst removal is effectively achieved with only an alkali metal compound. Even more remarkably, both the alkali metal compound and the DMC catalyst can be cleanly removed from the polyol without using magnesium silicate. Thus, the method of the invention provides a way to efficiently remove DMC catalyst residues from polyether polyols while reducing the level of solids required for catalyst removal.

DETAILED DESCRIPTION OF THE INVENTION

The invention is a method of purifying poly(oxypropylene) polyols that contain double metal cyanide (DMC) catalyst residues. Polyols purified by the method of the invention are the reaction products of hydroxyl group-containing initiators and propylene oxide. Suitable polyols include any poly(oxypropylene) polyols that can be made using only a DMC catalyst. The polyols may include a minor proportion of recurring polyether units derived from other epoxides such as ethylene oxide or butylene oxides, either as internal blocks or randomly distributed. Thus, the invention can be practiced with all-PO polyols, random EO-PO polyols, and the like. Most preferred are poly(oxypropylene) polyols derived from only propylene oxide. The method of the invention is not applicable, however, to ethylene oxide-capped poly(oxypropylene) polyols, which cannot generally be made using only a DMC catalyst.

The poly(oxypropylene) polyols useful in the invention generally have average hydroxyl functionalities within the range of about 1 to about 8, preferably from about 2 to about 6, and more preferably from about 2 to about 3. The polyols typically have number average molecular weights within the range of about 500 to about 50,000, preferably from about 1,000 to about 10,000, and more preferably from about 2,000 to about 8,000. Suitable methods for preparing the poly(oxypropylene) polyols using DMC catalysts are described, for example, in U.S. Pat. Nos. 3,278,457, 3,829,505, and 4,721,818; the teachings of these references related to polyol synthesis are incorporated herein by reference.

Following polyol synthesis, the poly(oxypropylene) polyols used in the invention will contain residual double metal cyanide catalyst residues. Untreated polyols typically will contain from about 50 to about 500 or more parts per million of DMC catalyst residues. Although much of this can be removed by simple filtration, a substantial proportion of the catalyst is apparently either dissolved or finely dispersed in the polyol, and is not easily removed.

The method of the invention involves, as an initial step, combining the poly(oxypropylene) polyol with an amount of an alkali metal compound sufficient to convert the DMC catalyst residues to an insoluble species, but not sufficient to generate polyol alkoxide groups. It was previously thought that an excess amount of the alkali metal compound was needed for adequate catalyst removal. For example, U.S. Pat. No. 4,877,906 teaches (claim 1(a)) to use enough of the alkali metal compound to "convert at least a portion of the polyol hydroxyl groups to alkoxide groups." Similarly, U.S. Pat. No. 4,721,818 teaches to convert the polyol hydroxyl groups to alkoxide groups by using an excess amount of an alkali metal hydride.

I have now surprisingly found that an excess amount of the alkali metal compound is not necessary or even desirable for removing DMC catalyst residues from poly(oxypropylene) polyols. In fact, using an excess amount of the alkali metal compound actually complicates catalyst removal because it adds the problem of removing residual basic catalyst in addition to the DMC catalyst. In contrast to the teachings of the prior art, I have found that more efficient catalyst removal is achieved when the amount of the alkali metal compound used is enough to convert the DMC catalyst to an insoluble species, but not so much that polyol alkoxide is generated.

Suitable alkali metal compounds for use in the invention are alkali metals, alkali metal hydroxides, alkali metal hydrides, and alkali metal alkoxides. Examples include, but are not limited to, sodium, sodium hydroxide, potassium hydroxide, lithium hydroxide, sodium hydride, potassium methoxide, and the like.

The amount of alkali metal compound used is important. The amount used is an amount just sufficient to convert all of the double metal cyanide catalyst to an insoluble species that can be removed easily by filtration. The amount used is not enough to generate polyol alkoxide groups. The amount needed will depend on the actual concentration of DMC catalyst used, which alkali metal compound is used, and which DMC catalyst is used, among other factors. The skilled person can determine the precise amount needed by routine experimentation. Generally, the preferred amount of alkali metal compound used will be less than about 1000 ppm based on the amount of treated polyol. A preferred range is from about 50 to about 1000 ppm. A more preferred range is from about 500 to about 1000 ppm of alkali metal compound; this range is generally most suitable for ordinary DMC catalyst levels of 250–500 ppm.

After combining the poly(oxypropylene) polyol and alkali metal compound, the mixture is heated in the absence of magnesium silicate with at least about 1.5 wt. % water at a temperature within the range of about 80° C. to about 150° C., preferably from about 100° C. to about 135° C. The mixture is then filtered to remove insoluble catalyst residues, and the filtered polyol mixture is finally stripped to remove water.

I have found that at least about 1.5 wt. % of water is needed for complete removal of DMC catalyst residues. When less water is present, removal of DMC catalyst residues is often incomplete. Preferably, the amount of water used is within the range of about 1.5 wt. % to about 5.0 wt. %; a more preferred range is from about 1.5 wt. % to about 3.0 wt. %. Larger amounts of water can be used, but do not appear to give an additional benefit in catalyst removal.

It is important that the water be present during the filtration of the polyol. While some prior-art methods teach to strip off water before filtering, filtration is faster and catalyst removal is more complete when water is stripped following filtration. The importance of filtering in the presence of water is also recognized in Japanese Pat. Appl. Kokai No. 4-214722.

I unexpectedly found that by reducing the level of alkali metal compound used in the method, magnesium silicate can be eliminated. Prior-art methods generally teach to heat base-containing polyols with magnesium silicate to adsorb the alkali metal. Usually, this is necessary because an excess of the alkali metal compound is used. Interestingly, efficient catalyst removal can be achieved without an excess of the alkali metal. In addition, the alkali metal that is introduced can be quantitatively removed without magnesium silicate when the amount of alkali metal used is just enough to convert the DMC residues to an insoluble species.

The ability to remove alkali metal and DMC catalyst residues without magnesium silicate is a key advantage because it reduces the cost of the method. This is particularly important for large-scale manufacturing runs. Adsorption methods for removing potassium from conventional polyols typically use 2–10 wt. % of solids. The method of the invention reduces material costs because one less reagent is needed. Waste disposal costs from magnesium silicate-containing filter cakes are also reduced. In addition, less of the valuable polyol product is lost in the filter cake.

Following heating of the polyol in the presence of water and the alkali metal compound, the polyol mixture is filtered to remove the insoluble catalyst residues, which are presumably the reaction product of the alkali metal and the DMC catalyst residues. Any suitable filtration technique may be used. If desired, the filtration can be performed in the presence of a filter aid such as diatomaceous earth or the like.

The filtration can be performed at any desired temperature. Elevated temperatures are preferred, especially for higher molecular weight polyols. Preferably, the filtration is performed at a temperature within the range of about 60° C. to about 150° C.; a more preferred range is from about 80° C. to about 130° C.

After filtering, the polyol mixture is stripped by any suitable method to remove water from the polyol. Preferably, the stripping is accomplished by heating the polyol at a temperature within the range of about 60° C. to about 150° C. while applying a vacuum to the polyol mixture. A flasher or a wiped-film evaporator is advantageously used. If desired, an inert gas can be sparged through the polyol mixture during vacuum stripping to assist in water removal.

The following examples merely illustrate the invention. Those skilled in the art will recognize many variations that are within the spirit of the invention and scope of the claims.

EXAMPLE 1

A 6000 molecular weight all-PO polyether triol is prepared from a 700 mol. wt. starter triol using zinc hexacyanocobaltate as a catalyst according to the method of U.S. Pat. No. 3,829,505. The untreated polyol product contains about 250–500 ppm of residual zinc hexacyanocobaltate catalyst; by elemental analysis, the catalyst contains 65–120 ppm Zn and 30–60 ppm Co.

The polyol is heated with aqueous KOH (750 ppm) at 115° C. for 3 h. Water (1.8 wt. %) is added, and the mixture is heated at 115° C. for an additional 3 h. The mixture is hot-filtered through a layer of diatomaceous earth, and the product is stripped to remove water. Elemental analysis of the treated polyol indicates: K:<0.3 ppm; Zn, Co:<2 ppm.

This example demonstrates that quantitative removal of both the alkali metal treating agent and the DMC catalyst residues is achieved, even in the absence of magnesium silicate, when just enough KOH is added to neutralize the DMC catalyst (without generating polyol alkoxide), and when sufficient water is present during the filtration.

COMPARATIVE EXAMPLE 2

The procedure of Example 1 is followed with these modifications: After heating the polyol with aqueous KOH for 3 h, magnesium silicate (0.8 wt. %) and water (1.8 wt. %) are added, and the mixture is again heated as described in Example 1. Water is removed by stripping the mixture for 3 h at 115° C. under vacuum (<20 mm Hg). The stripped mixture is hot filtered multiple times through diatomaceous earth. Elemental analysis of the treated polyol indicates: K: 6 ppm; Co: 4 ppm; Zn: 8 ppm.

This example shows that, even when a low concentration of KOH is used, and magnesium silicate is present, metals removal is incomplete if water is stripped from the polyol mixture prior to filtration.

COMPARATIVE EXAMPLE 3

The procedure of Example 1 is followed, except that KOH is used in an amount within the range of about 1500–3000 ppm. Elemental analysis is expected to show a relatively high level of residual potassium in the treated, filtered polyol because of the absence of magnesium silicate.

The preceding examples are meant as illustrations; the following claims define the invention.

I claim:

1. A method of purifying a poly(oxypropylene) polyol, said method comprising:
    (a) combining a poly(oxypropylene) polyol that contains double metal cyanide (DMC) catalyst residues with an amount of an alkali metal compound sufficient to convert the DMC catalyst residues to an insoluble species, but not sufficient to generate polyol alkoxide groups;
    (b) heating the polyol mixture in the absence of magnesium silicate with at least about 1.5 wt. % of water based on the amount of polyol at a temperature within the range of about 80° C. to about 150° C.;
    (c) filtering the polyol mixture to remove insoluble catalyst residues; and
    (d) stripping the polyol mixture to remove water from the polyol.

2. The method of claim 1 wherein the poly(oxypropylene) polyol has an average hydroxyl functionality within the range of about 2 to about 6, and a number average molecular weight within the range of about 500 to about 50,000.

3. The method of claim 1 wherein the poly(oxypropylene) polyol has an average hydroxyl functionality within the range of about 2 to about 3, and a number average molecular weight within the range of about 1,000 to about 10,000.

4. The method of claim 1 wherein the alkali metal compound is selected from the group consisting of alkali metals, alkali metal hydroxides, alkali metal alkoxides, and alkali metal hydrides.

5. The method of claim 1 wherein the amount of alkali metal compound is less than about 1000 ppm.

6. The method of claim 1 wherein the alkali metal compound is an alkali metal hydroxide, and the alkali metal hydroxide is used in an amount within the range of about 50 to about 1000 ppm.

7. The method of claim 1 wherein the filtration is performed in the presence of a filter aid.

8. The method of claim 7 wherein the filter aid is diatomaceous earth.

9. The method of claim 7 wherein the filtration is performed at a temperature within the range of about 60° C. to about 150° C.

10. A method of purifying a poly(oxypropylene) polyol, said method comprising:
   (a) combining a poly(oxypropylene) polyol that contains double metal cyanide (DMC) catalyst residues with an amount of an alkali metal hydroxide within the range of about 50 to about 1000 ppm wherein the amount is sufficient to convert the DMC catalyst residues to an insoluble species, but is not sufficient to generate polyol alkoxide groups;
   (b) heating the polyol mixture in the absence of magnesium silicate with at least about 1.5 wt. % of water based on the amount of polyol at a temperature within the range of about 100° C. to about 135° C.;
   (c) filtering the polyol mixture in the presence of diatomaceous earth at a temperature within the range of about 80° C. to about 130° C. to remove insoluble catalyst residues; and
   (d) stripping the polyol mixture to remove water from the polyol.

11. The method of claim 10 wherein the poly(oxypropylene) polyol has an average hydroxyl functionality within the range of about 2 to about 6, and a number average molecular weight within the range of about 500 to about 50,000.

12. The method of claim 10 wherein the poly(oxypropylene) polyol has an average hydroxyl functionality within the range of about 2 to about 3, and a number average molecular weight within the range of about 1,000 to about 10,000.

13. The method of claim 10 wherein the alkali metal hydroxide is selected from the group consisting of sodium hydroxide and potassium hydroxide.

14. The method of claim 10 wherein the alkali metal hydroxide is used in an amount within the range of about 500 to about 1000 ppm.

15. The method of claim 10 wherein the filtration is performed in the presence of a filter aid.

16. The method of claim 10 wherein the filter aid is diatomaceous earth.

17. A method of purifying a poly(oxypropylene) polyol, said method comprising:
   (a) combining a poly(oxypropylene) polyol that contains double metal cyanide (DMC) catalyst residues with an amount of an alkali metal hydroxide within the range of about 500 to about 1000 ppm wherein the amount is sufficient to convert the DMC catalyst residues to an insoluble species, but is not sufficient to generate polyol alkoxide groups;
   (b) heating the polyol mixture in the absence of magnesium silicate with an amount of water within the range of about 1.5 wt. % to about 3.0 wt. % based on the amount of polyol at a temperature within the range of about 100° C. to about 135° C.;
   (c) filtering the polyol mixture in the presence of diatomaceous earth at a temperature within the range of about 80° C. to about 130° C. to remove insoluble catalyst residues; and
   (d) stripping the polyol mixture to remove water from the polyol.

18. The method of claim 17 wherein the poly(oxypropylene) polyol has an average hydroxyl functionality within the range of about 2 to about 3, and a number average molecular weight within the range of about 1,000 to about 10,000.

19. The method of claim 17 wherein the alkali metal hydroxide is selected from the group consisting of sodium hydroxide and potassium hydroxide.

20. The method of claim 17 wherein the water stripping is performed under vacuum at a temperature within the range of about 60° C. to about 150° C.

* * * * *